United States Patent [19]

Lois

[11] Patent Number: 5,015,940
[45] Date of Patent: May 14, 1991

[54] PRESSURE CONSTRAINT OF A ROTATING ARTICLE SUCH AS A FLYWHEEL

[76] Inventor: Lambros Lois, 6104 Dunleer Ct., Bethesda, Md. 20817

[21] Appl. No.: 135,487

[22] Filed: Dec. 21, 1987

Related U.S. Application Data

[63] Continuation of Ser. No. 841,031, Mar. 17, 1986, abandoned, which is a continuation of Ser. No. 503,648, Jun. 16, 1983, abandoned, which is a continuation-in-part of Ser. No. 325,884, Nov. 30, 1981, abandoned.

[51] Int. Cl.$^5$ ............................. F16C 15/00; H02J 15/00
[52] U.S. Cl. ............................................ 322/4; 74/572; 310/90.5
[58] Field of Search ............................. 322/4; 74/572; 310/90.5

[56] References Cited

U.S. PATENT DOCUMENTS

| | | | |
|---|---|---|---|
| 2,351,424 | 6/1944 | Hansen, Jr. | 310/90.5 |
| 2,747,944 | 5/1956 | Baermann | 310/90.5 |
| 3,436,572 | 4/1969 | Storsand | 310/74 |
| 3,611,815 | 10/1971 | Fischell | 310/90.5 X |
| 4,035,659 | 7/1977 | Jeppson | 322/4 X |
| 4,065,189 | 12/1977 | Sikorra | 308/10 |
| 4,086,506 | 4/1978 | Kustom et al. | 310/74 |
| 4,091,687 | 5/1978 | Meinke et al. | 310/90.5 X |
| 4,128,020 | 12/1978 | Gray | 74/572 |
| 4,211,452 | 7/1980 | Poubeau | 310/74 |
| 4,233,521 | 11/1980 | Pouget | 310/74 |
| 4,343,203 | 8/1982 | Jacobson et al. | 74/572 X |
| 4,486,038 | 12/1984 | Bredenkamp | 308/10 X |

FOREIGN PATENT DOCUMENTS

| | | | |
|---|---|---|---|
| 54-13875 | 2/1979 | Japan | 74/572 |
| 7500027 | 7/1975 | Netherlands | 74/572 |
| 0783520 | 11/1980 | U.S.S.R. | 74/572 |

OTHER PUBLICATIONS

The Random House Dictionary of the English Language, College Edition (1968), p. 510.
"Flywheels", Post et al., Scientific American, Dec. 1973, 17-23.
"Perfect Flywheel", Renner-Smith, Popular Science, Jan. 1980, 76-79 and 150.
"Mechanical Energy Storage Technology Development Annual Report —FY78 Through Sping 1979", Woods, Sanda Laboratories Report No. SAND79 1151.

Primary Examiner—R. J. Hickey
Attorney, Agent, or Firm—Millen, White & Zelano

[57] ABSTRACT

The maximum kinetic energy per unit weight which can be stored in a rotating article, such as a flywheel, is a function of the tensile strength and the density of the material and is dramatically increased by subjecting it to an externally applied, inwardly directed radial pressure. The additional pressure is imposed by external means and is independent of the rotational motion of the article per se. Suitable pressurizing methods include magnetic containment, super-atmospheric gas containment, electrostatic containment and the like.

As a result of the external pressure, the maximum stored energy per unit of mass ($E_{max}/m$) of a rim flywheel can be greatly increased in accordance with the relationship:

$$\frac{E_{max}}{m} \sim \frac{\sigma}{2\rho} + \frac{RP}{\rho}$$

where $\delta$ is the uniform tensile strength of the flywheel material, $\rho$ is its density, R is the radius of the flywheel, and P is the external pressure. As a result, the maximum storage energy per unit mass of a flywheel need no longer be limited solely by its tensile strength and density in accordance with the classical first term of this equation.

This invention enables the practical use of flywheels for storing energy during off-peak power plant operation with subsequent extraction during peak demand periods, for powering vehicles and for numerous other applications. The phenomenon underlying this invention can also be used to improve the overall performance of rotating articles in general, e.g., by providing a method for correcting dynamic imbalances.

13 Claims, 4 Drawing Sheets

PRESSURE CONSTRAINT OF A ROTATING ARTICLE SUCH AS A FLYWHEEL

This application is a continuation of application Ser. No. 841,031, now abandoned, filed Mar. 17, 1986 which is a continuation of Ser. No. 503,648, now abandoned, of June 16, 1983 which is a continuation-in-part of Ser. No. 325,884 of Nov. 30, 1981, now abandoned.

BACKGROUND OF THE INVENTION

The energy crisis of the '70s has renewed interest in energy storage devices. The potential of the flywheel has been the subject of a great deal of effort and expense. The main thrust of its development in the United States has been toward flywheel designs using the new synthetic and very strong fibers like E-Glass, carbon fibers, S-Glass, PRD-49 or fused silica in various shapes and designs. (See, for example, "Flywheels", Post et al, Scientific American, December 1973, 17-23; "Perfect Flywheel", Renner-Smith, Popular Science, January 1980, 76-79 and 150; "Mechanical Energy Storage Technology Development Annual Report—FY78 Through Spring 1979", Woods, Sandia Laboratories Report No. SAND79 1151, the disclosures of all being entirely incorporated by reference herein.)

The underlying concept in flywheel storage is the deposition of energy as kinetic energy of rotation and extraction of energy usually via a motor-generator. For efficiency of material and space utilization, however, it is necessary to operate at very high rpm, namely in the area of 30,000 to 50,000 rpm. At such spinning rates, the flywheel is usually situated in vacuum to avoid air friction losses. It must also be supported with high efficiency mechanical or magnetic bearings.

As mentioned above, the primary effort in the development of efficient and inexpensive flywheels has been directed toward the exploitation of the super strong low density modern fibers. The strengths of such fibers permit the use of high rpm's and subsequently high values of the term $\sigma/2\rho$.

In an unconstrained flywheel, the critical quantity for the performance of a material is the ratio of its tensile strength to its density. The higher this ratio the larger the amount of energy that can be stored as kinetic energy in the flywheel. As a result, metals and in particular steel, which are used for the design of flywheels of moderate energy storage, have all but been abandoned as materials for modern, high rpm, high energy density flywheels. Their strength to density ratio is low and they tend to fail destructively.

On the other hand, the new materials mentioned above have much higher values of this ratio. However, they are also disadvantageous in view of the significant technical and economic problems posed in constructing appropriate flywheel designs from such fibrous materials.

There is a continuing need for improvements and increased latitude in design, preferably, designs which would permit the storage of sufficient energy for practical use and which would increase the maximum amount of storable energy.

SUMMARY OF THE INVENTION

Accordingly, it is an object of this invention to provide a design for rotating articles whereby the maximum kinetic energy per unit mass which they can tolerate before breaking up is increased.

It is another object of this invention to provide such a design which enables the use of system parameters other than tensile stress and density for changing the energy storage performance of a rotating article.

It is another object of this invention to provide various means for taking practical advantage of the new design of this invention, e.g., by providing a method for correcting dynamic imbalances in rotating devices.

Upon further study of the specification and appended claims, further objects and advantages of this invention will become apparent to those skilled in the art.

These objects have been achieved by this invention by providing a method for increasing the maximum kinetic energy per unit mass which can be achieved by a rotating article by externally applying an inward radial pressure thereto. This can be achieved, e.g., by containment of a magnetized flywheel in an oppositely oriented magnetic field, respectively, or by superatmospheric pressurization of the atmosphere surrounding a flywheel. The radial pressure is not the inherent centripetal pressure generated by the rotational motion. It is independent of the "centrifugal force" generated by the rotation of the article.

This invention also relates to articles which are rotating under an externally applied inward radial pressure.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
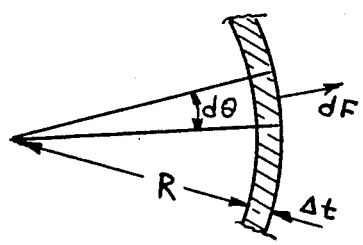
FIG. 1 depicts a model for a thin shell flywheel.

In order to demonstrate the nature of the effect of the external pressure, without intending to limit the scope of this invention in any way, a simplified flywheel configuration can be considered. Assume that the flywheel consists of a thin shell of radius R and thickness $\Delta t$ (see FIG. 1). The shell is rotating with an angular velocity $\omega$; the centrifugal force on an element of mass dm, is:

$$dF = dm R \omega^2 \quad (1)$$

or $$DF = dm_R v^2$$

where $v = R\omega$ the linear velocity of the rim. For a unit length of the cylinder, the element of mass is $$dm = R d\theta \cdot \Delta t \cdot l \cdot \rho \quad (2)$$

where $\rho =$ density of the material of the rim.

An effective pressure P is thus applied to the cylinder (an infinitely long cylinder). The force $$df = R d\theta \cdot P \quad (3)$$

would be acting on the element $R d\theta$. Hence, $R d\theta \cdot \Delta t \cdot \rho \cdot R \cdot \omega^2 = R d\theta \cdot P$ or the pressure P is:

$$P = (R \Delta t \cdot \rho) \cdot \omega^2 \quad (4)$$

Equation (4) defines an equivalent pressure P which is acting on the element $R d\theta$ of the shell when it is rotating with an angular velocity $\omega$. For a thin cylindrical shell (of infinite length) with an internal pressure P, the uniform tensile stress which will develop will be:

$$\sigma = \frac{P \cdot R \cdot 2}{2 \Delta t} \quad (5)$$

See, for example, any textbook on strength of materials. Equation (5) can be found in "Advanced Strength of Materials", Voltera et al, p. 211, Prentice-Hall, Englewood Cliffs, N.J. 1971. Naturally, the stress $\delta$ from equation (5) should not exceed the strength of the material of the rim.

Assume, now, that a uniform external compressive force, equivalent to a pressure $P_e$, is applied to the element of the rim. When the shell is rotating with an angular velocity $\omega$, the net pressure acting on it is $P - P_e$. When the angular velocity is such as to create an equivalent pressure $P + P_e$, the effective pressure will be P. In this case, from equation (4):

$$\omega^2 = \frac{P + P_e}{R \cdot \Delta t \cdot \rho} \quad (6)$$

But for a given material $\sigma$ is known. Hence, P can be defined from equation (5), i.e., $$P = \frac{\Delta t \cdot \sigma}{R} \quad (7)$$

Substituting (7) into (6)

$$\omega^2 = \frac{\frac{\Delta t \cdot \sigma}{R} + P_e}{R \cdot \Delta t \cdot \rho} = \frac{(\Delta t \cdot \sigma + R \cdot P_e)}{R^2 \cdot \Delta t \cdot \rho} \quad (8)$$

However, the kinetic energy of the shell is $E = \frac{1}{2}(I\omega^2)$ (wherein I is the moment of inertia, $I = m \cdot R^2$). Hence, the expression for the kinetic energy becomes:

$$E = \frac{1}{2}(m R^2 \cdot \omega^2) \quad (9)$$

The quantity which is to be maximized is the energy stored per unit mass, i.e., $$\frac{E}{m} = \frac{1}{2} R^2 \cdot \omega^2 \quad (10)$$

Using equation (8), $$\frac{E}{m} = \frac{\sigma}{2\rho} + \frac{1}{2} \cdot \frac{R}{\Delta t \cdot \rho} \cdot P_e \quad (11)$$

Equation (11) gives two components of the kinetic energy. The first one is the classical term showing the dependence on material strength and density. It has formed the basis for the direction of development of the flywheel, i.e., toward materials with high $\sigma$ (high strength) and low density (light materials). For example, the Post et al reference lists candidate materials rated for their potential for use in flywheels based on this relationship.

The other term $$\frac{1}{2} \cdot \frac{R}{\Delta t \cdot \rho} \cdot P_e$$

is the result of this invention. It indicates an additional amount of energy which can be stored in the flywheel when an external pressure $P_e$ exists. In addition, it shows that this energy is directly proportional to the pressure itself and the radius of the rim and inversely proportional to the mass of the rim per unit length. This provides an entirely new latitude in flywheel design.

For example, if the flywheel materials of interest are essentially invariant with respect to their densities (e.g., in the case of magnetic materials used in systems where a magnetic field provides the external pressure $P_e$), efforts can be expended to increase R, decrease $\Delta t$ and/or increase $P_e$. If practically attainable values of $P_e$ are limited (in the case of the magnetic system, this involves an upper limit on the magnetic induction which can be attained), design efforts can be made to increase R, and/or decrease $\Delta t$. Of course, in other systems (e.g., in designs where gas pressurization or electrical charges provide $P_e$), where possible, all four of the parameters can be suitably optimized to attain maximum energy per unit mass.

It is interesting to note, again without intending to limit the scope of this invention in any way, that equation (11) can be derived in an entirely different way. Using the above symbolism, the moment of inertia is $$I = 2\pi R \cdot \Delta t \cdot l \cdot \rho \cdot R^2 (= m R^2)$$

per unit height, i.e., $$I = 2\pi R^3 \cdot \Delta t \cdot \rho \quad (12)$$

and $$E = (\tfrac{1}{2}) I \omega^2 \pi \cdot R^3 \cdot \Delta t \cdot \rho \cdot \omega^2$$

To calculate the total force on the semicircle assume an element $dm = R \cdot d\theta \cdot \Delta t \cdot \rho$ and $$\Delta F = R \cdot d\theta \cdot \Delta t \cdot \rho \cdot R \cdot \omega^2 = R^2 \cdot \omega^2 \cdot \rho \cdot \Delta t \cdot d\theta \quad (13)$$

Figure 2:
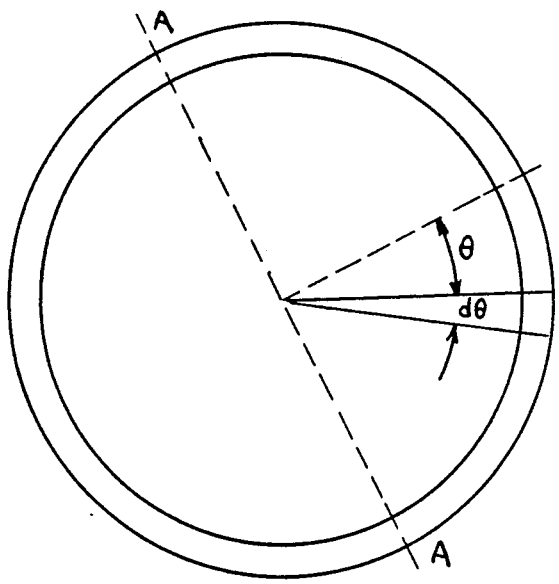
FIG. 2 depicts a model for calculation of the force and stress on a thin shell cylindrical flywheel.

Integrating (13):

$$F_T = 2 \int_0^{\pi/2} \Delta F = 2R^2\omega^2\rho \cdot \Delta t \int_0^{\pi/2} \cos\theta d\theta \quad (14)$$

where a projection in a direction perpendicular to any diameter AA of FIG. 2 is assumed. The integral of equation (14) yields:

$$\int_0^{\pi/2} \cos\theta d\theta = -\sin\theta \Big|_0^{\pi/2} = -(-1) = 1.$$

Hence, $F_T = 2R^2 \cdot \omega^2 \rho \cdot \Delta t$. The stress $$\sigma = \frac{F_T}{2\Delta t} \text{ or } \sigma = R^2\omega^2 \cdot \rho \quad (15)$$

Therefore, from (12)

$$E = \pi \cdot R \cdot \Delta t \cdot (R^2\omega^2\rho) = \pi \cdot R \cdot \Delta t \cdot \sigma \quad (16)$$

which means that the energy increases with the radius. But the mass $$m = 2\pi R \Delta t \cdot \rho \quad (17)$$

Thus, $$\frac{E}{M} = \frac{\pi \cdot R^3 \cdot \Delta t \cdot \rho \cdot \omega^2}{2\pi R \cdot \Delta t \cdot \rho} = \tfrac{1}{2}R^2\omega^2 \quad (18)$$

From $\sigma = R^2\omega^2\rho$ $$\frac{E}{m} = \frac{\sigma}{2\rho}$$

which is the first term of equation (11). Equation (18) holds without external pressure of any kind.

The maximum energy per unit mass is:

$$\frac{E_{max}}{m} = \tfrac{1}{2}R^2\omega^2_{max}$$

where $\omega_{max}$ is determined from the maximum stress $\sigma_{max} = R^2\omega_{max}^2 \cdot \rho$. Assume, now, that an external pressure $P_e$ is applied. A force $\Delta F_{P_e}$, opposite to the centrifugal force $\Delta F_c$, will develop on an element $R\Delta\theta$, i.e., $\Delta F_{P_e} = R \cdot \Delta\theta \cdot p_e$. Hence, the net force outward will be $\Delta F = R^2\omega^2\rho\Delta t\Delta\theta - P_e = R\Delta\theta(R\omega^2\rho\Delta t - P_e)$, assuming that $F_c > F_p$. The total force on the semiplane is:

$$F_T = 2R(R\omega^2\rho\Delta t - P_e) \quad (19)$$

The corresponding stress is $$\sigma = \frac{R}{\Delta t} \cdot (R\omega^2\rho\Delta t - P_e) \quad (20)$$

The first term in the parenthesis is the "centrifugal pressure" which develops from rotation, denoted as $P_o$. Then $$\sigma = \frac{R}{\Delta t} \cdot (P_o - P_m). \text{ Setting } \sigma_{max} = R^2\omega_{max}^2 \cdot \rho, \quad (21)$$

$$R^2\omega_{max}^2 \rho = \frac{R}{\Delta t}(R\omega_{P_{max}}^2 \rho\Delta t - P_e)$$

where $\omega_{P_{max}}$ is the maximum angular velocity in the presence of an external pressure $P_e$. From equation (21), $$\omega_{P_{max}}^2 = \omega_{max}^2 + \frac{P}{R\rho\Delta t} \quad (22)$$

but $E = \tfrac{1}{2}I\omega^2$; hence $$E_{P_{max}} = \tfrac{1}{2}I\omega^2_{P_{e_{max}}} = \tfrac{1}{2}\pi R^3\rho\Delta t\omega^2_{P_{e_{max}}} =$$

$$\tfrac{1}{2}\pi R^3\rho\Delta t\left(\omega_{max}^2 + \frac{P_e}{R\rho\Delta t}\right)$$

From $m = \pi R\Delta t \cdot \rho$, $$\frac{E_{max}}{m} = \frac{E_{max}}{m} + \frac{1}{2} \cdot \frac{P_e R}{\rho\Delta t}. \quad (23)$$

Since $\frac{E_{max}}{m} = \frac{\sigma}{2\rho}$, $$\frac{E_{P_{max}}}{m} = \frac{\sigma_{max}}{2\rho} + \frac{1}{2}\frac{P_e R}{\rho\Delta t} \quad (24)$$

Which is the same as equation (11).

As can be seen from the foregoing, the essential feature of this invention is the application to a rotating article of an externally applied, inwardly directed radial pressure which is independent of and not derived from the rotational motion of the article, e.g., from the "centrifugal" force of the rotating article. As a result of this simple expedient, the maximum energy which can be stored via the rotational motion is significantly increased.

Any means which produces a pressure which acts on the rotating article inwardly and radially can be used in accordance with this invention.

All such means are thus contemplated equivalents for use in conjunction with this invention. The exemplary means discussed below in no way are intended to limit the scope of this application. Thus, the flywheel can be made to rotate in a high pressure atmosphere. It can be subjected to a magnetic field of a given orientation and made to rotate in an environment having a magnetic field at the outer boundary of the flywheel which is likewise oriented (See FIG. 3).

Any other method for creating the requisite pressure can be used, e.g., by creating a repulsion between the outer boundary of the flywheel and the immediately adjacent environment, be it a magnetic-, electrical-, physical-, chemical- or otherwise- based phenomenon.

In all of the embodiments, the flywheel itself can be fully conventional in all aspects. This includes the aspect of accommodating the higher rates of rotation which are enabled by this invention. For example, this will be significantly facilitated by the fact that the normal increased stresses on the system, e.g., on bearings, due to the higher rpm's, will be minimized by this invention since most or all of these stresses will be transferred to the containment means of this invention. Essentially, only the inward radial pressure generating means will differentiate the flywheel or other rotating articles of this invention from those of the prior art.

Figure 3:
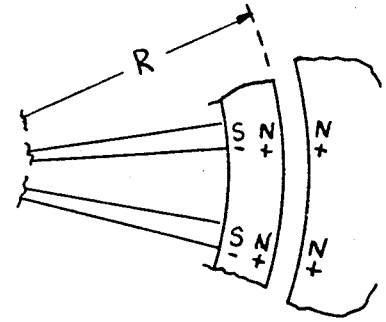
FIG. 3 shows one embodiment of a flywheel configuration of this invention using magnetic containment.

As an example, magnetic containment can be used to generate the pressure of this invention. For this former, of course, the material must be magnetic e.g., iron, steel, cobalt, etc. One of the possible variations of this embodiment is depicted in FIG. 3. The direct opposition of the same polarities in the perimeter of the flywheel and its immediate environment creates a repulsion which exerts a compressive action on the rotating flywheel. The magnetic fields may be generated by permanent magnets or electromagnets using very well known technology as disclosed, e.g., in V. Gonrishankar, "Electromechanical Energy Conversion", International Text Book Company, Scranton, Pa., 1966; D. V. Richardson, "Handbook of Rotating Electric Machinery", Reston, Va., 1980; and A. J. Ellison, "Electromechanical Energy Conversion" Reinhold Publishing Company, New York, N.Y., 1965, all of whose disclosures are incorporated by reference herein. In one method, for example, the flywheel is rotated inside a cylinder whose inner diameter is just larger than the outer diameter of the flywheel. The flywheel is magnetized in one polarity and the cylinder is magnetized in the same polarity as shown in FIG. 3.

Only conventional technology and considerations would be involved in achieving any magnetic configuration required by this invention. The sizes, e.g., diameters and thicknesses of all elements would be chosen to optimize the performance of a given system in accordance with routine considerations of flywheel technology, magnetic and electrical technology and the principles developed herein with respect to this invention, as well as other routine considerations conventionally employed by those skilled in the art in parametrically optimizing performance of a given device. The same applies to all embodiments of this invention.

Regarding magnetic materials, great progress has been made in the last decade. One such material which is used for permanent magnet motors to reduce weight and improve performance is SmCo$_5$. This material is also characterized by high strength and stability of its magnetic field. (See, for example, literature provided by Molycorp Inc.) Another material with outstanding magnetic properties is Alnico 9 which can achieve even higher magnetic field values but which does not show as good field stability. However, for a stationary system where the weight is not a primary consideration, especially for the non-rotating part of a system of this invention, i.e., the outside magnets electromagnetic designs could very easily be used.

In one method of implementing the magnetic version of this invention, the necessary radial pressure can be effected by using a flywheel having a rim which is permanently magnetized. This can be rotated inside a cylinder which is also appropriately permanently magnetized (See FIG. 3) or in a magnetic field provided, e.g., by the configuration of electromagnets shown in FIG. 7.

Figure 9:
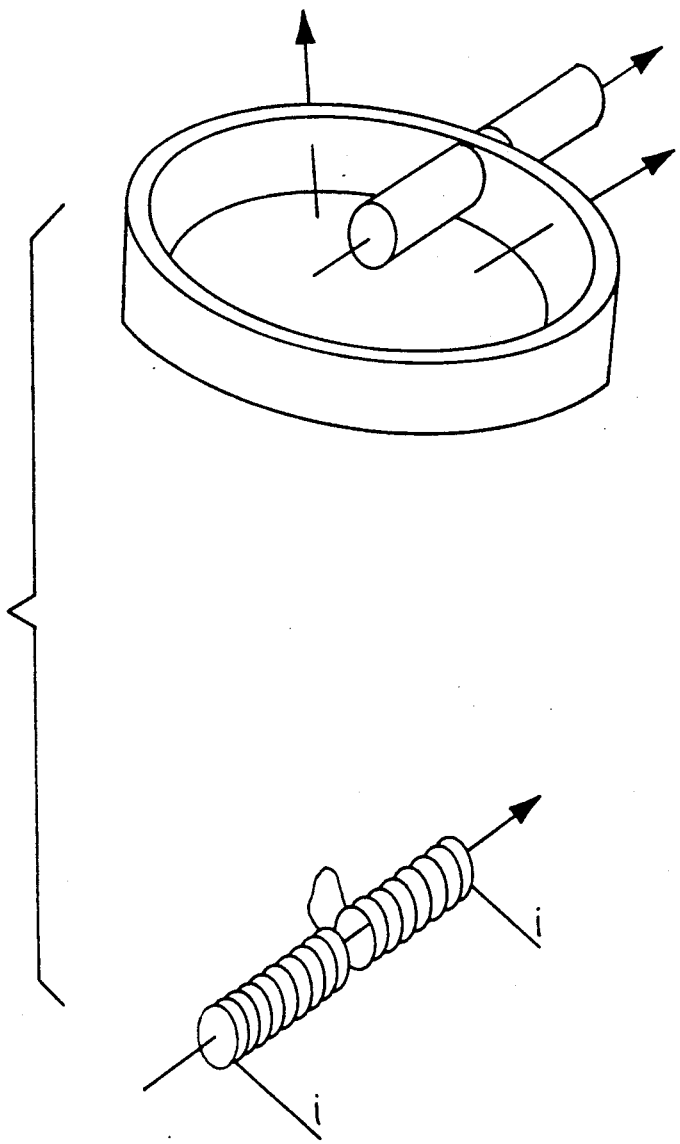
FIG. 9 schematically illustrates a two-piece metallic strip.

A permanently magnetized solid or rim cylinder can be easily and conventionally provided by passing the unmagnetized rim through a two piece coil e.g., as shown in FIG. 9. The magnetic field produced in the solid rim or cylinder will be uniform and oriented vertically to the plane of the rim as required for implementation of this invention.

Alternatively, a reinforced magnetized solid rim can be easily and conventionally provided by magnetizing a long thin strip as described above and winding the thin strip to make the rim of the flywheel. The many turns in the rim also conveniently provide additional tensile strength and make it more difficult for the rim to uncoil.

Figure 7:
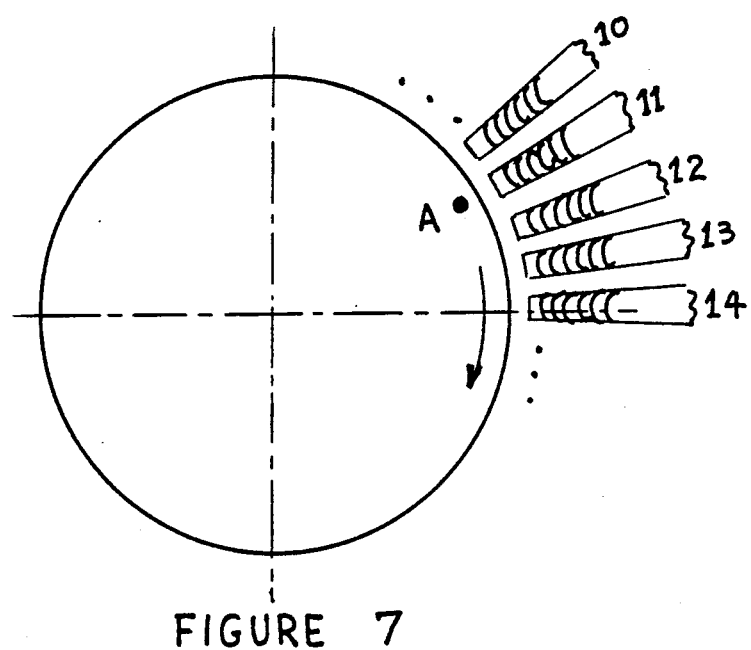
FIG. 7 shows one embodiment of magnetic containment using an arrangement of electromagnets which is also useful for dynamic balancing or a rotating device or article.

In another method, the arrangement of electromagnets shown in FIG. 7 can be used. The electromagnets on the flywheel itself can be made by providing coils around the spokes of the flywheel per se or by providing coils around supplemental rods disposed radially about the flywheel, on one or both sides, etc., for the purpose of generating the magnetic field. The necessary windings, switching means and other associated hardware and design elements are fully conventional.

Figure 10:
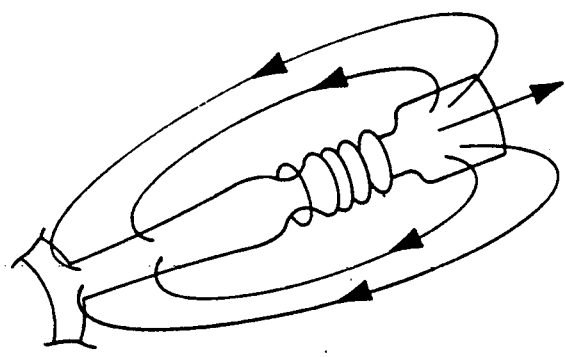
FIG. 10 illustrates the radially directed magnetic field provided by an electromagnet.

The magnetic field lines associated with each of the individual electromagnets can be illustrated as shown in FIG. 10. As can be seen, each arrangement provides a radially directed magnetic field. It is a simple matter to provide the necessary radial pressure by simply passsing current of proper orientation through the outside electromagnets and the inside electromagnets.

Figure 11:
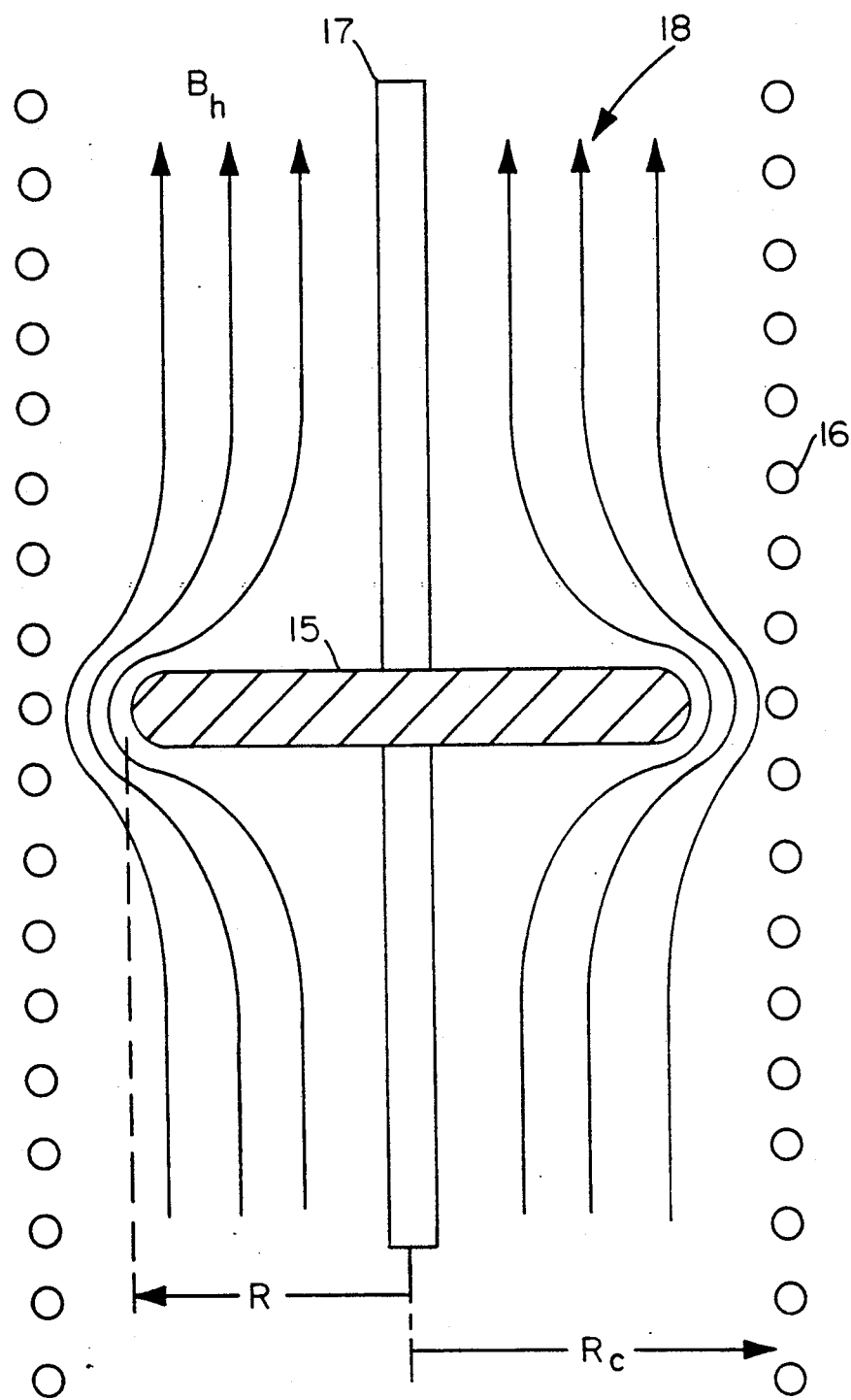
FIG. 11 illustrates a preferred magnetic configuration of this invention.

In a preferred magnetic embodiment of a different inventive entity, the configuration of FIG. 11 is utilized. A flywheel or other rotating article 15, made of very high conductivity material, is located inside a magnetic coil (solenoid) 16, with its axis of rotation 17 lying along the magnetic axis. When a step function current passes through the coil, a magnetic field is generated, which is excluded from the high conductivity disc. Therefore, the magnetic field lines are distorted as shown schematically in FIG. 11. As a consequence of this distortion, the field is practically zero inside the disc and very large at its rim. The enhancement of magnetic field of the rim can be easily computed from the conservation of the magnetic flux and is $$B_r = B_h \frac{R_c^2}{(R_c^2 - R^2)} \approx \frac{B_h}{2} \frac{R_c}{(R_c - R)},$$

where $B_r$ is the magnetic field at the rim, $R_c$ is the coil radius, R is the flywheel radius and $B_h$ is the magnetic field far away from the flywheel. Accordingly, a substantial enhancement of magnetic field can be achieved when the ratio $R_c/(R_c-R)$ is large. FOr example, when $B_h=4$ kG and the ratio $R_c/(R_c-R) = 100$, the field at the rim is 200 kG. The corresponding magnetic pressure is 1,600 atm.

The step function magnetic field may not be practical shown continuous or very long time operation of the flywheel is required. Since any practical disc has a finite conductivity, the field will progressively penetrate the conductor and, thus, the pressure differential that is responsible for the compensation of stresses will be lost. This difficulty can be avoided by using an alternating voltage to power the coil. The frequency $\omega$ of this voltage must be such that $\omega\tau >> 1$ where $\tau$ is the magnetic diffusion time of the disc. Since $\tau$ is proportional to $\sigma R\Delta$, where $\sigma$ is the conductivity of the material and $\Delta$ the disc thickness, the diffusion time can be long ($10^{-1}$–1 sec). Therefore, this condition can be easily satisfied.

Figure 4:
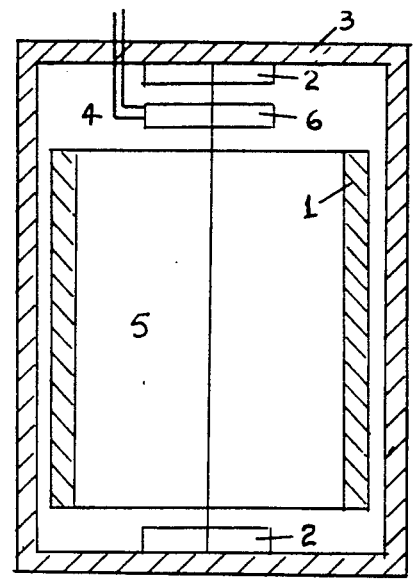
FIG. 4 shows one embodiment of a flywheel configuration of this invention using gas pressurization containment.

Another way to impose the necessary pressure on the rotating flywheel is by operating it in a chamber which is under superatmospheric pressure. Such a configuration is schematically illustrated in FIG. 4. Flywheel 1 is supported on two bearings 2. It rotates in a pressure chamber 3. The space between the flywheel and the compressive chamber 4 is filled with a gas under high pressure e.g., via a conventional valve. The flywheel is sealed so that its internal space 5 can be maintained under vacuum if desired. Energy input and output is accomplished with a motor/generator set 6. All of the hardware and system design needed for implementation of this mode, is clearly fully conventional.

Simple calculations show that for a conventional flywheel made out of steel, the breaking point is attained at relatively low rpm's of 1000 - 2000. Accordingly, rather conventional bearings can be utilized while still attaining low mechanical friction. Using any pressure containment of this invention, this breaking point can be significantly increased to larger rpm's, thereby increasing $E_{maxm}$. The resultant linear and angular velocities are such that still only conventional bearings will be needed. The linear velocity achieved in such circumstances is in the range of 400–600 or higher m/sec. At such velocities, there are many applications for which it will be possible to practically employ such a configuration, despite the frictional losses occurring when gas pressurization is used, i.e., due to the interaction of the gas with the flywheel. Such losses, of course, can be minimized by using low viscosity gases such as hydrogen or helium.

As indicated above, one of the major advantages of the present invention is that it is no longer necessary to optimize only the tensile stress and density of a material. The devices based on this state of the art approach are difficult to manufacture and do not lend themselves readily to mass or inexpensive production. With this invention, more conventional materials can be utilized and high rpm's, and, hence energy storage, can be achieved by taking advantage of the pressure dependent effects of this invention.

In one particular application of this invention, the requirement for higher rpm's can be alleviated in view of the details of the additional term $$\frac{1}{2} \frac{R}{\Delta t \cdot \rho} \cdot P_e$$

For example, in a given system, R can be increased beyond the values to which it is conventionally limited. This R limitation exists in state of the art devices since the stresses on the outer portions of a rotating flywheel are the largest. Since larger R values mean larger stresses, attainable R values are restricted by the maximum stress tolerable by the flywheel material (i.e., the above-discussed first term). With this invention, previously unachievable radii can be obtained by exertion of the requisite external containment pressure which increases the maximum tolerable stress. At these increased R values, at the same ω (rpm) as conventional, for example, the flywheel stores more energy since in the outer regions (increased R values), the linear velocities (v) are higher. ($E = \frac{1}{2}mv^2$). Thus, using conventional technology at currently available rpm's, more energy can be stored since larger flywheels can be used. Alternatively, at the larger R's made possible by this invention, lower rpm's than currently necessary could be used to store the same amount of energy.

It must be realized that the precise form of the second term of the equation as defined above, in no way limits this invention. Its details are derived from the assumptions regarding the configuration of the flywheel. However, irrespective of the assumptions made regarding the nature of a flywheel, the second term of equation (11) will be proportional to $$\frac{R \cdot P_e}{\rho}$$

and the same new and advantageous flexibility discussed above will be derived.

For any of the flywheels or other rotating articles of this invention, the configuration can be either vertical or horizontal. In addition, any conventional means, mechanical, electrical or otherwise, for extracting the stored energy out of the rotating object can be used. Normally, it would be electrical for flywheels, e.g., via a motor/generator system. Mechanically, a clutch-type system is usually employed. This aspect of this invention is fully conventional and discussed in many references. Similarly, unless specified otherwise herein all other details of the flywheels and other rotating articles of this invention are fully conventional, e.g., including overall dimensions, construction details, shapes, load bearings, etc., as fully discussed in many references such as those incorporated by reference above and others.

Again, without intending to limit the invention in any way, a quantitative appreciation of the magnitude of the two terms in equation (11) can be gained by computing $E_{max/m}$ for some conventional materials. For Alnico 6, $\sigma = 23,000$ psi $= 1565$ atm and $\rho = 7.3$ g/cm³. (See, e.g., "Permanent Magnets and Their Application", Parker et al, John Wiley and Sons, Inc., New York, 1962, which is incorporated by reference herein.) In addition, assume $R = 350$ cm and $\Delta t = 5$ cm. A large value of the ratio $R/\Delta t$ is required to justify the use of equation (5). Finally, assume P(magnetic) $= 55$ atm. Under these conditions, $\sigma/\rho = 5.83$ Whr/kg. Similarly, the second term of equation (11) becomes $$\frac{1}{2} \frac{R}{\Delta t \cdot \rho} \cdot P_e = 7.2 \text{ Whr/kg}.$$

Several important observations can be made. For example, the second term which comes from the pressure of this invention is bigger than the $\sigma/\rho$ term related to the properties of the material. Moreover, the total power density, i.e., 13.0 Whr/kg is close to currently achievable power densities. (For example, in a recent study by Sandia National Laboratories for a flywheel magnetic bearing [SANDIA-79-7007], a 10 kWhr flywheel has a mass of 727 kg, i e., 13.8 Whr/kg.) However, a much higher $\sigma/\rho$ can be obtained if one uses higher strength steel. For example, Post et al. mentioned above lists values of the term $\frac{1}{2} \cdot \sigma/\rho$, such as 48 Whr/kg. Alternatively, one could use the modern fibers having $\sigma/\rho$ values much higher than 13 Whr/kg.

It would also be possible to increase the value of E/m for a flywheel by making appropriate variations as already discussed, e.g., by increasing R, decreasing Δt, or increasing the pressure As shown above, the energy storable in a flywheel can be conventionally maximized by using a material of large σ and low ρ. It can be maximized per this invention by exerting the necessary external radial pressure. A particularly desirable flywheel would be a hybrid taking advantage of both methods of maximizing E/m.

One such hybrid would utilize the state of the art designs which maximize $\sigma/\rho$ using the new high stress fibers. The external pressure could be applied by low viscosity fluid (e.g., gaseous) pressurization.

Figure 5:
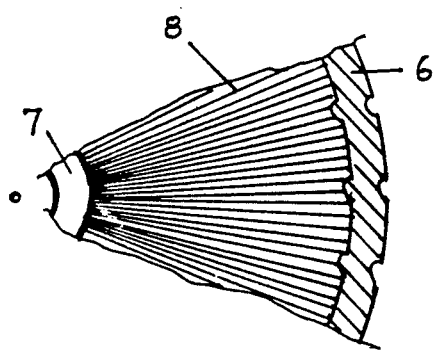
FIG. 5 shows one embodiment of a hybrid flywheel of this invention.

In another hybrid design, the same fibers could be employed in conjunction with a flywheel rim made of a material which is susceptible to magnetic field containment. One such embodiment is depicted in FIG. 5.

Typically, the new fibers with high $\sigma/\rho$ values are made from long polymeric molecules such as plastics or carbon fibers or the like which are not ferromagnetic. In FIG. 5, a ferromagnetic material rim 6 with a number of bends in its cylindrical surface is connected to a central hub 7 by a multiplicity of radial connections (strings) which are made from the new high strength materials. The ferromagnetic rim can be a permanent magnet or an electromagnet with one pole being the outer face of the rim and the other the inner face. The rim, optionally but preferably, has indentations parallel to the axis of the flywheel. These are advantageous since, under conditions of operation, the rim will be subjected primarily to hoop stress while the spokes will be subjected to tensile stress. The high strength material of the radial connections tends to elongate more than metallic connections would under the same stress. The rim, on the other hand, under conditions of hoop stress will not elongate if it is smooth, i.e., just a cylindrical surface. The indentations, however, allow the cylindrical surface to expand outwardly to accommodate the expansion of the radial connections. It is to be understood that such changes in dimension under stress are extremely small but, unless provision is made for this expansion, the radial loading will not be uniform and the flywheel may eventually disintegrate.

The effect of the indentations under the influence of the centrifugal force is to act as "bellows" in the radial direction. Using conventional considerations, the hybrid flywheel can be designed to ensure there are no permanent deformations of the indentations, i.e., the expansion will take place within the elastic limit of the material of the rim. For example, the relationship of the expansion (i.e., deformation or elongation) in the radial direction dr of the flywheel is related to the increase (deformation or elongation) of the perimeter dl through the relationship $\Delta l = 2\pi \Delta r$ or $dl = 2\pi dr$ which is obvious from the relation $l = 2\pi r$, where $l$ = perimeter and $r$ = radius. The expected material elongations under the expected stress field will fulfill this equation when the flywheel is stressed under its expected load.

Figure 6:
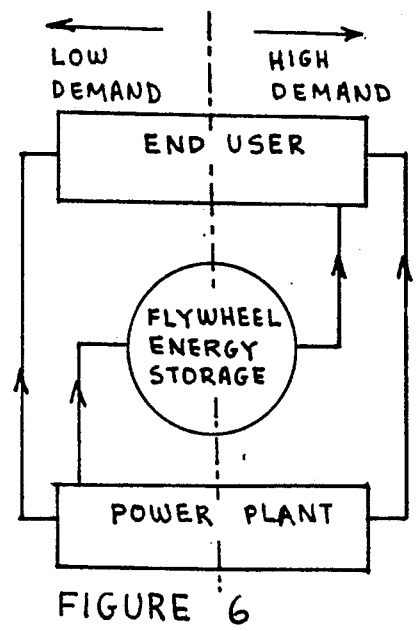
FIG. 6 shows one application of a flywheel of this invention to power plant energy storage.

The flywheels of this invention can be used in all applications heretofore conventional or contemplated. One primary use is in energy storage for a power plant. As shown in FIG. 6, during periods of relatively low power demand, e.g., during nights when energy production from base plant operation is cheapest, the flywheel can be spun-up using a conventional motor/generator mechanism. During high or peak demand periods, e.g., daytime in summer with increased air conditioning use, the rotational motion of the flywheel is then used to drive the generator which, in turn, converts the rotational energy into electricity for end uses. In essence, cheap electricity from efficient based plants is stored for use in periods of peak demand when low efficiency expensive power plants are used.

The flywheel of this invention can also be used in other conventional or prototype systems using conventional considerations, e.g., in vehicles or in home use as described in many literature articles such as those incorporated by reference herein.

As previously indicated, there are other applications to which the underlying concept of this invention can be applied, i.e., applications of an external inwardly directed radial pressure on a rotating object. For example, using electromagnets, any rotating piece of machinery or other device can itself be magnetized similar to the magnetization of the flywheel described above. It can be made to rotate in an oppositely oriented magnetic field, again similar to the foregoing description with respect to the flywheel. The external magnetic field will be controllable and adjustable, features which can be provided, e.g., by the use of electromagnets. In this way, the magnetic field can be made to respond to changes in the rotational motion of the rotating article or can be made to adjust the rotational motion of the article in response to other system determinants.

For example, in general, it is always necessary to maintain a rotating object in dynamic balance. Often dynamic balance is especially critical such as in the case of a turbine. Once an imbalance occurs, the rotational motion will be affected and will be observable, e.g., by detection of abnormal vibrations. If the electromagnetic field surrounding the rotating object is generated as depicted in FIG. 7, an appropriate correction can be made in the external field to compensate for the imbalance. For example, in the illustrated embodiment, electromagnets 10, 11, 12, 13, etc. produce the overall external field. The off-balance mass on the rotating device is represented by the mass (A) as shown in FIG. 7. As a result, an extra centrifugal force, $F = mR^2\omega^2$ exists causing the out-of-balance condition. When the mass (A) passes in front of the first electromagnet, its field can be adjusted to minimize the detected out-of-balance condition using conventional feed back circuitry. Similarly, as the mass moves in front of the sequential subsequent magnets, the fields will be similarly suitably adjusted to provide a counterforce to the additional centrifugal force which will eliminate the effect of the mass eccentricity (A).

Any means which is capable of detecting an out of balance condition in a rotating object can be used as control means for adjusting the external electromagnetic field. Convention vibration frequency and amplitude detection, measuring and monitoring devices exist and are in commercial use. Their signal can be used as a feedback to eliminate the out of balance condition by generation of an appropriate counterforce. This technique provides a new method for fine balancing rotating devices which very often are the critical element in many end use devices such as turbines, centrifuge machines, and a host of other devices in almost every field of industry. It will be of special advantage in applications where high g values are involved because of very high rpm's. For example, in the case of a turbine, each of the blades could be appropriately magnetized and made to rotate in a magnetic field generated by electromagnets in its casing.

Figure 8:
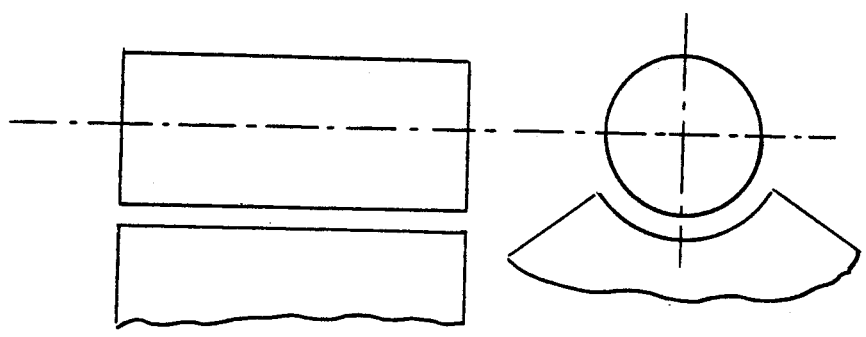
FIG. 8 shows another application of the underlying principle of this invention, i.e., to magnetic support of a rotating device.

In another application of the same principle, the external field can be used to provide an additional external force which helps support the weight of a rotating device. For example, in the case of a horizontal flywheel, its weight or a portion thereof can be supported magnetically by provision of a magnetic field at its lower portion. When the entire device is surrounded by an external magnetic field, for example, to take advantage of the other aspects of this invention, the same weight support can be achieved by positioning extra separate electromagnets in its lower portion. The current to these electromagnets can be adjusted to develop a higher magnetic field at the lower end as compared to the other portions of the rotating device. (See FIG. 8, for example.)

For all of the applications of the underlying principle of this invention, it is important that the external constraining force, magnetic, fluid pressurization or otherwise, be applied uniformly to the outer perimeter of the rotating object. Of course, it must also be in the inward radial direction. A non-uniform force may introduce oscillations into the flywheel. However, as discussed above, where a non-uniform force applied to the outer perimeter of a rotating device is unavoidable, electromagnetic feedback can be utilized in order to precisely tailor the surrounding force field to the requirements at hand in order to precisely balance the rotating device, i.e., to remove any imbalances which otherwise might exist. See, for example, FIG. 7 and the accompanying discussion.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flywheel system useful for storage and subsequent retrieval of energy in the form of potential energy associated with its rotational motion, and which has a maximum amount of energy which can be stored therein corresponding to its maximum rate of revolution, the improvement wherein the flywheel system further comprises a gas-tight chamber housing said flywheel, valve means associated with said chamber and adapted for pressurizing the inside of the chamber with a gas, said chamber and valve means being effective for applying to the perimeter of the flywheel an inward radial pressure additional to any such pressure derived from the rotational motion itself, said additional pressure being generated by said gas when said chamber is pressurized therewith and being sufficiently continuous whereby the maximum rate of revolution of said flywheel and, correspondingly, the maximum energy storage in said flywheel are substantially increased.

2. A method of increasing the maximum rate of rotation and correspondingly the maximum kinetic energy per unit mass which can be tolerated before breakup by a rotating flywheel of a sufficiently large structure to be practical for storing and subsequently retrieving energy, which is rotating on a shaft and has a perimeter portion extended from said shaft, comprising applying to said perimeter of the rotating flywheel an inward radial pressure additional to any such pressure derived from the rotational motion itself, said additional pressure being sufficiently continuous whereby the maximum rate of revolution of said flywheel and, correspondingly, said maximum kinetic energy per unit mass are substantially increased.

3. In a method of storing energy in a flywheel of a sufficiently large structure to be practical for storing and subsequently retrieving energy comprising rotating said flywheel by means of said energy and, subsequently, retrieving the energy from the rotational motion of said flywheel, the improvement comprising applying to the perimeter of the flywheel an inward radial pressure additional to any such pressure derived from the rotational motion itself, said additional pressure being sufficiently continuous, whereby the maximum rate of revolution of said flywheel and, correspondingly, the maximum energy storable in said flywheel are substantially increased.

4. A method of claim 3, wherein the energy stored in the flywheel is generated by a power plant during low demand periods and the stored energy is retrieved during high demand periods.

5. A method of maintaining the dynamic balance of a turbine rotating on a shaft and having turbine blades having respective perimeter portions extended from said shaft and having magnetic means, comprising applying to said perimeter portions of the rotating turbine a magnetic field generating an inward radial pressure on said perimeter portions, and adjusting the magnetic field generated at said perimeter portions in response to an out-of-balance condition of the rotating turbine such that a balanced condition is achieved.

6. A combination of a flywheel of a sufficiently large structure to be practical for storing and subsequently retrieving energy, which is rotating on a shaft and has a perimeter portion extended from said shaft and having magnetic means, and (b) a magnetic field applied to said perimeter effective to generate an inward radial pressure sufficient to increase the maximum rate of rotation of said flywheel.

7. The combination of claim 6 further comprising means for magnetizing the perimeter of the flywheel in a given orientation, and means for applying at the locus of the perimeter of the flywheel a magnetic field having an orientation with respect to said magnetized perimeter such that an inward radial pressure is exerted on said perimeter.

8. The combination of claim 7 wherein the means for magnetizing said perimeter comprises a set of electromagnets radially disposed about the flywheel and the means for applying said magnetic field to the locus of the perimeter comprises a second set of electromagnets located outside and along the perimeter of the flywheel, the magnetic axis of each electromagnet being radially aligned with respect to the flywheel.

9. The combination of claim 7 wherein the flywheel rim is permanently magnetized and the means for applying said magnetic field to the locus of the perimeter comprises a set of electromagnets located outside and along the perimeter of the flywheel, the magnetic axis of each electromagnet being radially aligned with respect to the flywheel.

10. A combination of (a) a flywheel of a sufficiently large structure to be practical for storing and subsequently retrieving energy, which is rotating on a shaft and having a perimeter portion extended from said shaft and having magnetic means, and (b) a magnetic field applied to said perimeter effective to generate an inward radial pressure, the strength of said magnetic field being adjustable in response to an out-of-balance condition of the rotating flywheel such that a balanced condition is achieved.

11. A combination of (a) a turbine having turbine blades which rotate on a shaft and have perimeter portions extending from said shaft and having magnetic means, and (b) a magnetic field applied to said perimeter portions effective to generate an inward radial pressure sufficient to increase the maximum rate of rotation of said turbine.

12. The combination of claim 11, wherein said turbine has a maximum tensile stress which can be tolerated during rotation before breakup, corresponding to a maximum rate of rotation, and wherein said increase in the maximum rate of rotation substantially increases the maximum tolerated tensile stress.

13. A combination of (a) a turbine having turbine blades which rotate on a shaft and have perimeter portions extended from said shaft and having magnetic means, and (b) a magnetic field applied to said perimeter portions effective to generate an inward radial pressure, the strength of said magnetic field being adjustable in response to an out-of-balance condition of the rotating turbine such that a balanced condition is achieved.

* * * * *